R. GAGE.
Improvement in Mangles.
No. 127,971. Patented June 18, 1872.
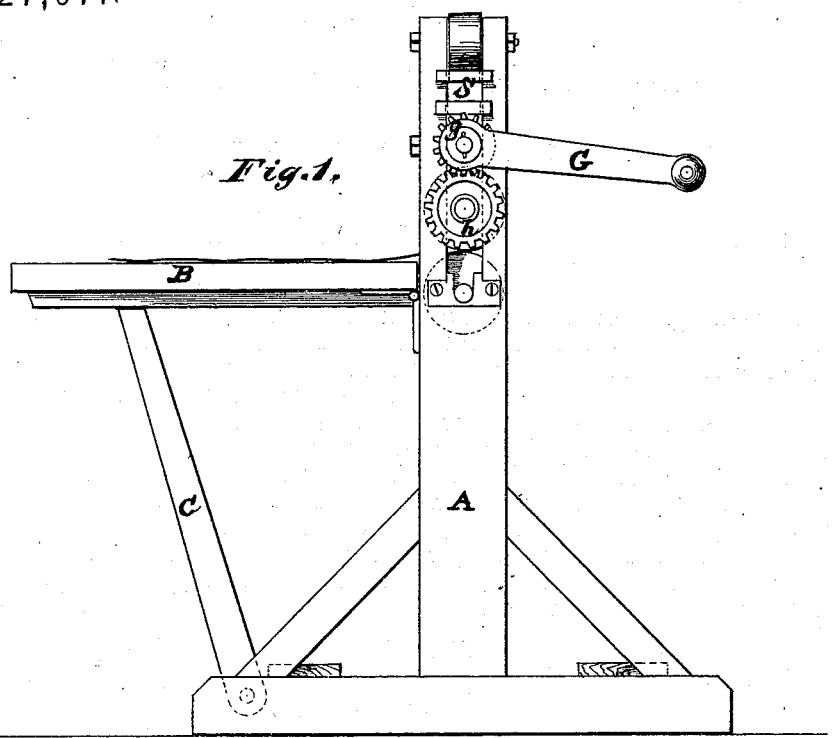
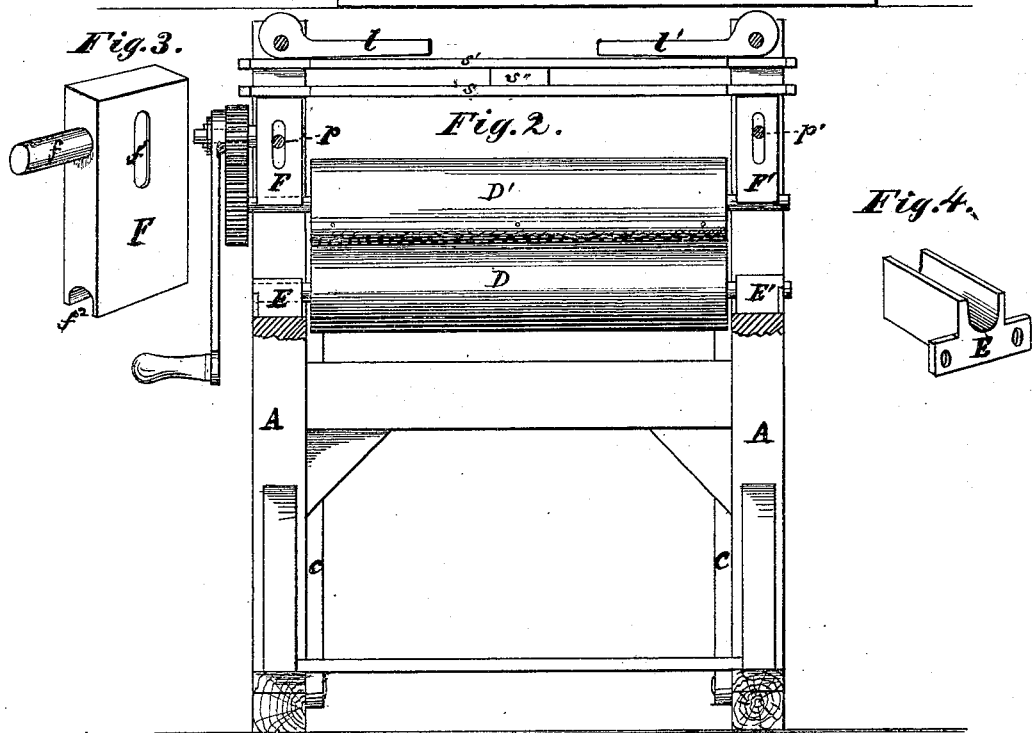
Witnesses.
H. L. Perrine
W. H. Finckel
Inventor.
Robert Gage,
by Geo. A. Rothwell
atty.

UNITED STATES PATENT OFFICE.

ROBERT GAGE, OF KINGSTON, CANADA.

IMPROVEMENT IN MANGLES.

Specification forming part of Letters Patent No. 127,971, dated June 18, 1872.

Specification describing certain Improvements in Mangles, invented by ROBERT GAGE, of Kingston, Province of Ontario, Dominion of Canada.

My invention consists in the several improvements in mangles hereinafter described.

In the drawing, Figure 1 is a side elevation of a mangle having my improvements attached. Fig. 2 is a front elevation of the same. Figs. 3 and 4 are views of the bearings of the upper and lower rollers, respectively, detached.

A is the frame of the mangle, provided with a hinged table, B, supported by a pivoted rod, C. D is the lower roller, whose axle rests in the metallic bearings E E', shown detached in Fig. 4. The upper roller D' rests upon the lower roller. Its axle carries at one end gear-wheel $h$, and is steadied and kept in place by metallic vertical bearings F F', Fig. 3, being a detached view of F. The upper ends of standards of frame A are slotted to receive these metallic bearings F F'. The bearing F is grooved at $f^2$ to rest upon the axle of roller D'. It fits into the slot formed for it in the frame-standard, and is steadied, guided, and allowed a vertical movement by means of its slot $f^1$ and the steady-pin $p$, which is secured to frame A and passes into slot $f^1$. The shaft $f$ is rigidly attached to it, and carries the pinion and crank $g$ G. The pinion $g$ gears with wheel $h$. Bearing F' is the counterpart of F, except in the particular of having no shaft $f$. It is set into the other slotted standard of frame A, steadied, guided, and allowed a vertical movement similar to bearing F. Upon these bearings rests a straight double spring, S, consisting of two pieces of wood or metal, $s\ s^1$, connected at their center by a block, $s^2$. Two cam-levers, $l\ l'$, are pivoted, one to each standard of the frame, and act upon the spring S, and through it upon roller D'. This construction gives elasticity to the presser-roller D', and renders it possible to modify the pressure at will. It is obvious that the bearings F F', by means of their slots, allow the roller D' to rise or fall as occasion requires, and that pinion $g$ and wheel $h$ are always in gear.

I claim as my invention—

1. The journal-boxes or guides F F', constructed with slots, as described, for the purpose set forth.
2. The combination of roller D' with bearings F F', pinion $g$, journal $f$, and wheel $h$, all constructed and arranged substantially as herein described.
3. The combination of rollers D D' with bearings F F', pinion $g$, journal $f$, crank G, wheel $h$, springs S, and cam-levers $l\ l'$, as and for the purpose set forth, all constructed and arranged substantially as described.

ROBERT GAGE.

Witnesses:
    HORACE A. FERGUSON,
    HUGH RALSTON.